(12) United States Patent
Stevick et al.

(10) Patent No.: US 11,929,514 B2
(45) Date of Patent: Mar. 12, 2024

(54) END CAP FOR BATTERY OR CYLINDRICAL RECHARGEABLE CELL

(71) Applicants: Glen R Stevick, Berkeley, CA (US); Philip E. Alei, Carlsbad, CA (US); Rong Yuan, Richmond, CA (US)

(72) Inventors: Glen R Stevick, Berkeley, CA (US); Philip E. Alei, Carlsbad, CA (US); Rong Yuan, Richmond, CA (US)

( * ) Notice: Subject to any disclaimer, the term of this patent is extended or adjusted under 35 U.S.C. 154(b) by 168 days.

(21) Appl. No.: 17/396,680

(22) Filed: Aug. 7, 2021

(65) Prior Publication Data
US 2022/0052405 A1 Feb. 17, 2022

Related U.S. Application Data

(60) Provisional application No. 63/066,090, filed on Aug. 14, 2020.

(51) Int. Cl.
*H01M 50/152* (2021.01)
*H01M 10/04* (2006.01)
(Continued)

(52) U.S. Cl.
CPC ..... *H01M 50/152* (2021.01); *H01M 10/0422* (2013.01); *H01M 10/0525* (2013.01);
(Continued)

(58) Field of Classification Search
CPC .. H01M 50/152; H01M 50/559; H01M 50/59; H01M 50/147; H01M 50/148; H01M 10/0422; H01M 10/0525; H01M 2200/00
See application file for complete search history.

(56) References Cited

U.S. PATENT DOCUMENTS

| 5,348,815 A | 9/1994 | Barker |
| 2010/0136409 A1* | 6/2010 | Straubel ............ H01M 50/128 429/129 |

(Continued)

FOREIGN PATENT DOCUMENTS

| JP | 2007109577 A * 4/2007 |
| KR | 2010093988 A * 8/2010 |

(Continued)

OTHER PUBLICATIONS walmart.com, 5 pcs 18650 Lithium Ion Cell Battery Holder Bracket (8 pages), https://www.walmart.com/ip/5-Pcs-18650-Lithium-Ion-Cell-Battery-Holder-Bracket-for-DIY-BAttery-Pack/127129546; Visited Mar. 9, 2019.

(Continued)

*Primary Examiner* — Christopher P Domone
*Assistant Examiner* — Jonathan William Estes

(57) ABSTRACT

Devices for insulating the electrical terminals of cylindrical batteries, such as lithium-ion cells, to prevent the occurrence of shorting. One configuration is a device or apparatus which covers one or more terminals of the cell, thereby providing an insulative barrier, while still allowing the cell to be used. Another configuration is a cell covering partially covering the topmost portions of the negatively charged exterior cell case, closest to the positive terminal of the cell, and attaching the covering via a circumferential appendage which locks onto the cell. In another configuration the cell covering extends axially down the side of the cell case to cover part of, or the entirety of, the side of the negatively charged case.

12 Claims, 4 Drawing Sheets

(51) Int. Cl.
    *H01M 10/0525*    (2010.01)
    *H01M 50/559*     (2021.01)
    *H01M 50/59*      (2021.01)

(52) U.S. Cl.
    CPC .......... *H01M 50/559* (2021.01); *H01M 50/59* (2021.01); *H01M 2200/00* (2013.01)

(56) References Cited

U.S. PATENT DOCUMENTS

| | | | |
|---|---|---|---|
| 2020/0395587 A1* | 12/2020 | Ryu | H01M 50/107 |
| 2021/0052904 A1* | 2/2021 | Doerr | H01G 11/46 |

FOREIGN PATENT DOCUMENTS

| | | | | |
|---|---|---|---|---|
| KR | 20180080798 | * | 7/2018 | |
| WO | WO-2019074234 A1 | * | 4/2019 | H01M 10/04 |

OTHER PUBLICATIONS prba.org: Rechargeable Battery Association Safety Policy on Use and Handling of Stand-alone Cylindrical Lithium ion Cells (2 pages), http://www.prba.org/wp-content/uploads/PRBA-Policy-on-Use-of-Stand-Alone-Li-ion-Cells-18.pdf; Visited Mar. 9, 2019.
nitecorestore.com; Nitecore NL 1826R Micro-USB Rechargeable 18650 Battery (4 pages), https://www.nitecorestore.com/ProductDetails.asp?ProductCode=BAT-NITE-18650-NL 1826R&gclid= EAlaIQobChMlrlrBwYD24AIVzB6tBh3BbAREEAQYBiABEgIFvPD_BwE; Visited Mar. 9, 2019.
hacker-motor-shop.com; Battery End Caps (7 pages), https://www.hacker-motor-shop.com/Batteries-and-accessories/Rx-Batteries/Mounting-PCBs-brackets-and-accessories/Battery-end-caps.htm?shop =; Visited Mar. 9, 2019.
electricbike.com, What's Inside an 18650 Cell (16 pages), https://www.electricbike.com/inside-18650-cell/; Visited Mar. 9, 2019.

* cited by examiner

END CAP FOR BATTERY OR CYLINDRICAL RECHARGEABLE CELL

RELATED APPLICATION DATA

This application claims the benefit of U.S. Provisional Application No. 63/066,090 filed Aug. 14, 2020, which is hereby incorporated by reference.

BACKGROUND

The field of present disclosure relates to devices which insulate the electrical terminals of cylindrical batteries, or cells, to prevent or reduce the occurrence of shorting.

Today, lithium-ion cells are manufactured into standard sizes and shapes. Common cylindrical lithium-ion cell models include the 18650, 26650, 14500, and 21700 cells. Conventional design of these cylindrical cells has placed the positive and negative terminals in close proximity to one another with only a thin insulator (approximately 1 mm in thickness) separating them. To further protect against shorting, a thin polymer wrapper is usually applied to these cells which covers the majority of the negatively charged case. The present inventors have recognized that these thin wrappers can easily be damaged during use as the cells are inserted or removed from electronic devices and consequently, this damage usually occurs at the top of the battery where the positive and negative terminals are closest to one another, leaving the cell vulnerable to accidental shorting.

There are products comprise of a molded silicone case designed to completely surround the cell for storage or transport. These cases serve well to insulate the cells terminals from one another but must be removed while the cell is in use.

The present inventors have recognized that these existing devices do not provide the continuous protection needed to prevent a short from occurring across terminals of a lithium-ion cell during use, leaving the cell vulnerable to failure.

SUMMARY

The present disclosure relates to battery terminal covers or insulators. Certain embodiments are directed to battery endcaps or covers which protect one or more terminals of a battery with a mechanically tough, insulative, polymer material that is sufficiently insulative and mechanically tough so that it may serve to prevent accidental shorting of the battery. Shorting a battery, such as a lithium-ion cell, can quickly lead to failure of the cell which can cause bodily harm and property damage. These devices may be used in many fields such as industrial or consumer electronics where portable energy cells are used to power equipment or devices.

DETAILED DESCRIPTION

Certain embodiments will now be described more fully with reference to the accompanying drawings.

Certain embodiments may be used in consumer and industrial electronics where cylindrical lithium-ion cells, such as an 18650 cell, are used to provide electrical power. Certain embodiments may create a simple and convenient device for protecting the terminals of a cylindrical lithium-ion cell from shorting. Conventional design of current cylindrical lithium-ion cells has placed the positive and negative terminals close to one another, leaving the cell vulnerable shorting across the terminals. An electrical short can result in failure of the cell which may include explosion and or ignition of the contents of the cell, which could result in bodily harm or property damage. The exterior case of these cells is made of steel and is connected to the internal negative terminal the cell. This construction makes the entire exterior case of a cylindrical lithium-ion battery to act as the negative terminal. Typically, a thin polymer film is wrapped around the majority of the exterior case to protect against shorting between the positive and negative terminals. This thin polymer film can easily become torn or damaged during normal use of the cell, leaving the cell vulnerable to shorting across the terminals. Certain embodiments described may be effective at preventing shorting across the terminals of the cell by providing an insulating barrier over one or more of the cells terminals.

In one embodiment, a ring-shaped battery endcap may be made of an insulating material, such as a polymer. This ring-shaped battery endcap may be configured to securely fit over the end of the cell so as to cover the top portion of the cells exterior case, where the exterior case is closest to the positive terminal. A central hole in the ring-shaped battery endcap encircles the positive terminal of the cell, leaving it exposed. The endcap may be secured to the cell via a circumferential appendage which snaps into a cylindrical groove in the cell case. Additionally, and adhesive may be used to secure the endcap to the cell case. The ring-shaped battery endcap serves to provide an insulation barrier between the positive and negative terminals, reducing the risk of shorting the cell.

In an alternate embodiment, a cylindrical battery endcap may be made of an insulating material, such as a polymer. This cylindrical battery endcap may be configured to securely fit over the end of the cell so as to cover the top portion and sides of the cells exterior case. A central hole in the cylindrical battery endcap encircles the positive terminal of the cell, leaving it exposed. The end cap may cover part of, or the entirety of, the side of the cells exterior case to provide an insulation barrier between the positive and negative terminals. This embodiment may be secured to the cell by a compression fit between the end cap and the side of cell or an adhesive.

Figure 1:
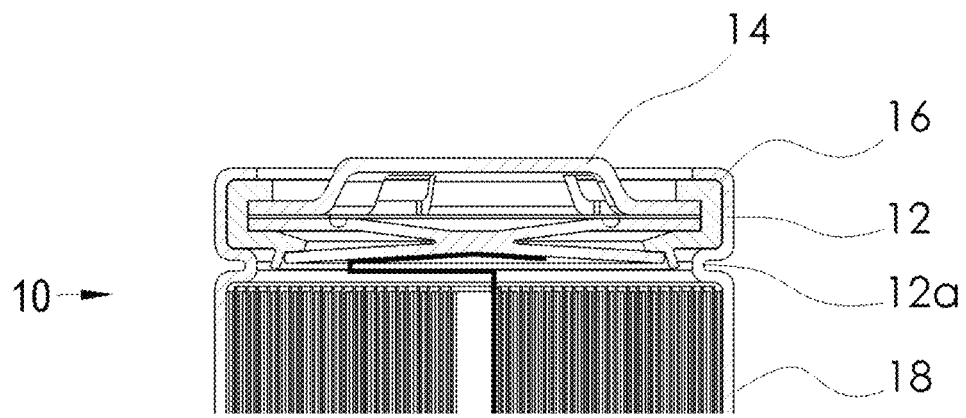
FIG. 1 is a cross-sectional view of the positive (top) portion of a typical lithium-ion cell.

FIG. 1 is a cross-sectional view of the positive (top) portion of a typical lithium-ion cell, in this example a model 18650 cell. The cell 10 includes a (negative −) outer case 12, a positive (+) cap 14 (or positive terminal), an insulator 16 between the negative case 12 and the positive cap 14, a thin plastic wrapper 18 attached to the outside of the case 16. The case 12 is typically formed with a cylindrical groove 12a disposed near the top portion of the cell 10.

Figure 2:
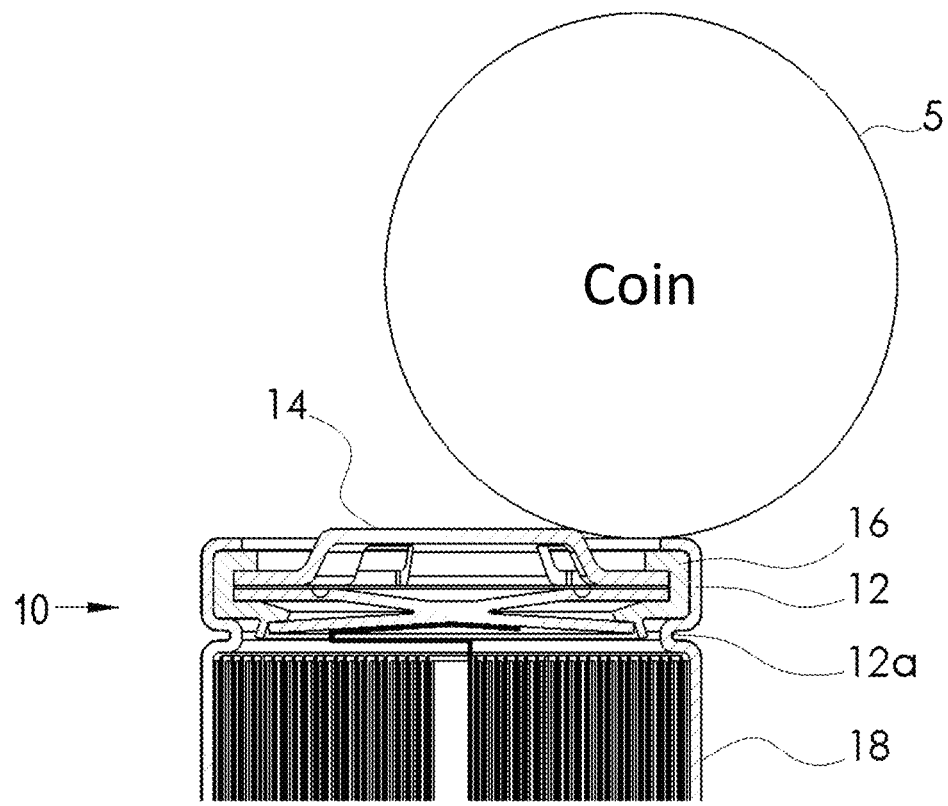
FIG. 2 is a cross sectional view of the lithium-ion cell from FIG. 1 with a coin contacting the positive and negative terminals to illustrate how the cell can be shorted.

FIG. 2 is a cross sectional view of lithium-ion cell from FIG. 1 with a coin 5 added to illustrate how the cell could be accidentally shorted. In this example a coin 5 is used as the conductor between the positive and negative terminals. Moreover, if the thin plastic wrapper 18 has been damaged at the edge close to the positive terminal, then the steel case may become exposed. The cell may be shorted when the coin 5 comes in contact with the positive terminal 14 and the negative terminal 16 simultaneously.

Figure 3:
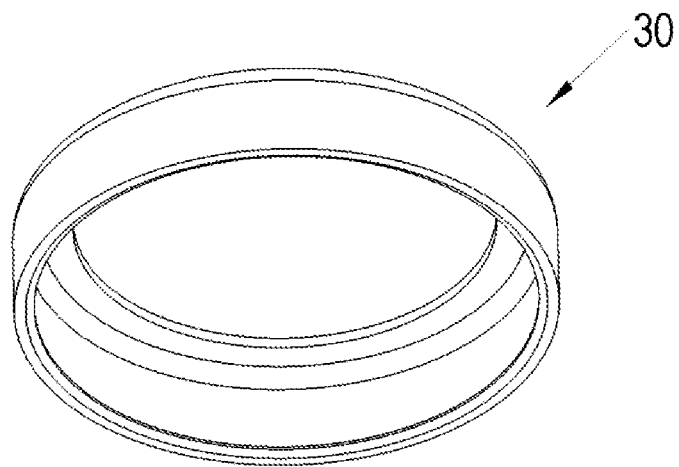
FIG. 3 is an isometric view of an end cap for a battery or cylindrical rechargeable cell according to an embodiment.

FIG. 3 is isometric view of an end cap 30 for a battery or cylindrical rechargeable cell according to the first embodiment.

Figure 4:
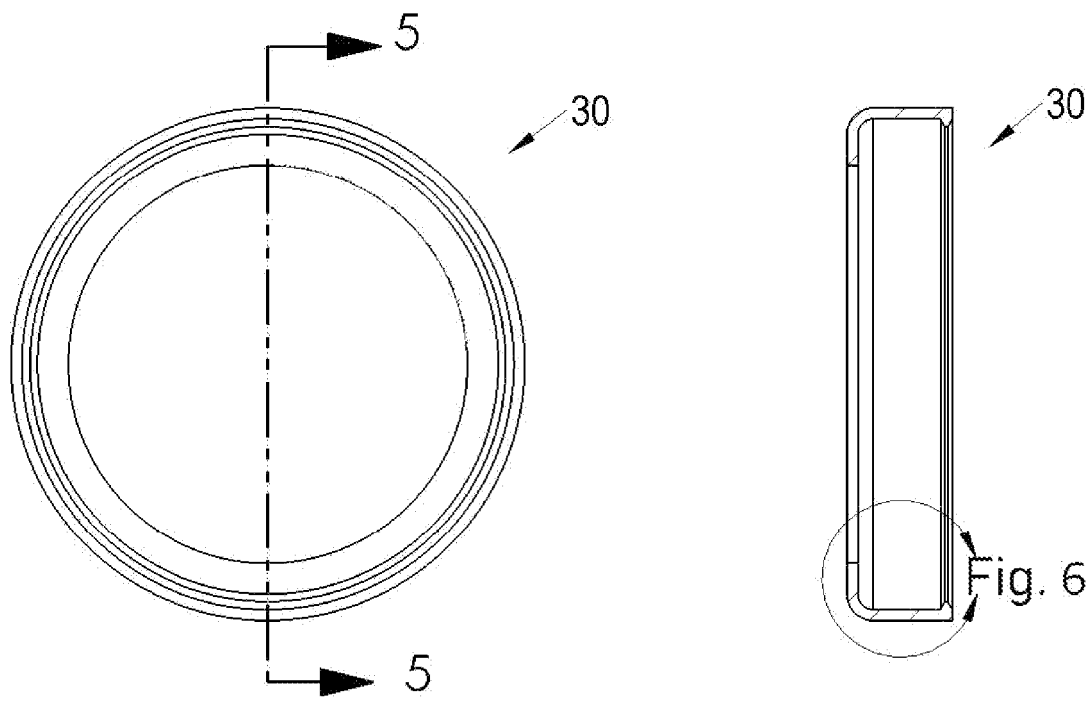
FIG. 4 is a bottom view of the end cap of FIG. 3.

FIG. 4 is a bottom view of the end cap 30 with section line 5-5. The end cap 30 may be designed to cover the parts of the lithium-ion cell negative case 12 closest to the positive terminal 14, while leaving the positive terminal 14 exposed through central hole 30d.

Figure 5:
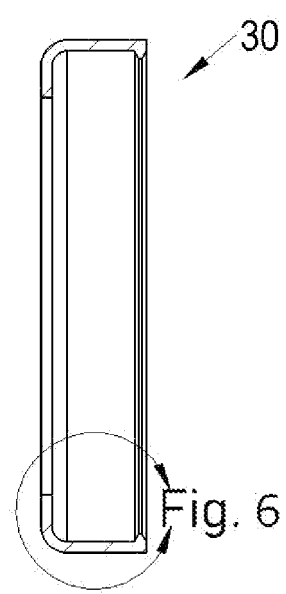
FIG. 5 is a cross-sectional view of the end cap of FIG. 4 taken along line 5-5.

FIG. 5 is a cross-sectional view of the end cap 30 from FIG. 4 taken along line 5-5.

Figure 6:
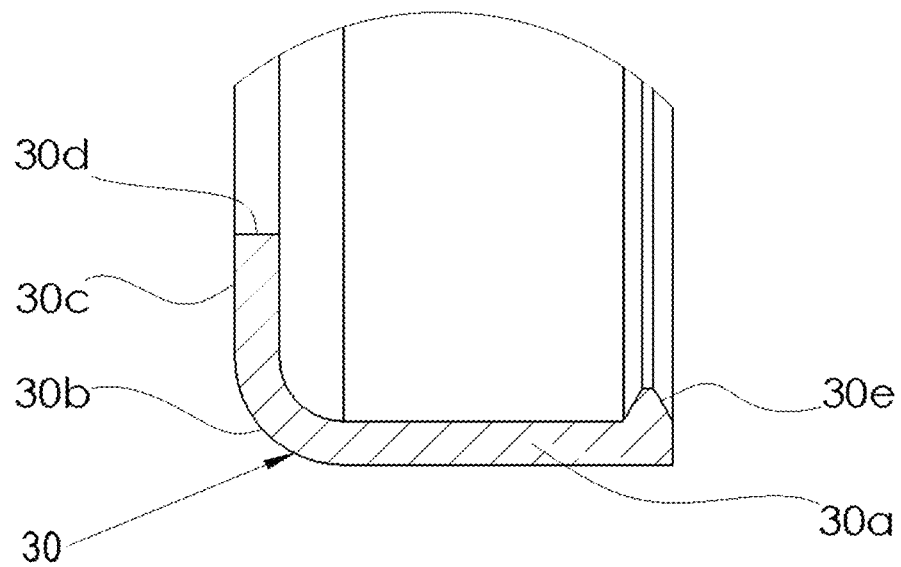
FIG. 6 is an enlarged view of a portion of FIG. 5.

FIG. 6 is a detailed view of FIG. 5 of a portion of the endcap 30. The end cap 30 includes a cylindrical side wall 30a, transitioning at an upper corner 30b to top wall 30c. The top wall 30c includes a central hole 30d for providing access to the positive cap 14 of the cell 10. At the bottom edge of the cylindrical side wall 30a is circumferential appendage 30e extending radially inward, such that when the end cap 30 is installed on a cell 10, the appendage 30e seats into the cell groove 12a of the cell 10 such that the end cap 30 is held in place by the appendage 30e in the groove 12a.

Figure 7:
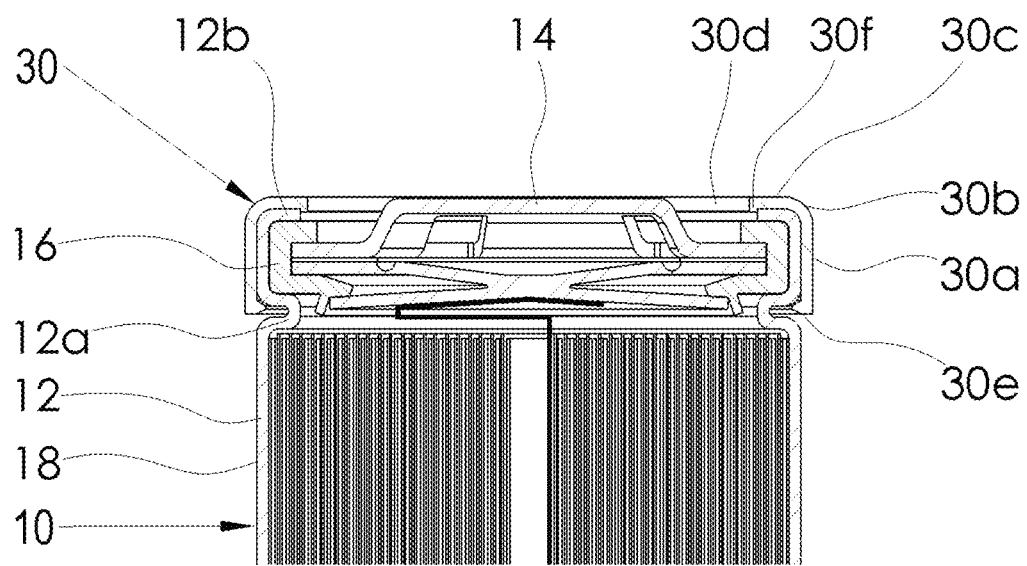
FIG. 7 is a cross-sectional view of an insulating battery end cap installed on a lithium-ion cell as in FIG. 1.

FIG. 7 illustrates the end cap 30 installed on the battery or cell 10. As illustrated, the top wall 30c extends radially inward toward the positive cap 14 to cover the top portion 12b of the case 12. The inner edge of the central hole 30d may include an optional shoulder 30f that seats between the top portion 12b of the case 12 and the insulator 16 thereby providing a better mating fit of the cap 30 onto the cell 10. Alternately, the top wall 14 may further extend radially inward all the way to the positive cap 14. As shown, the appendage 30e seats within the cell groove 12a thereby holding the end cap 30 in place.

Figure 8:
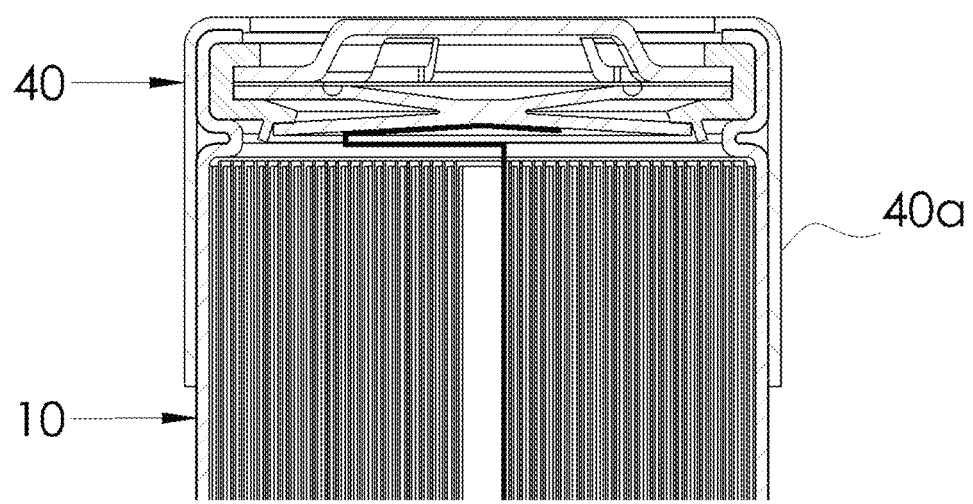
FIG. 8 is a cross-sectional view of an alternate embodiment of the insulating battery end cap installed on lithium-ion cell as in FIG. 1.

FIG. 8 is an isometric view of a battery end cap according to a second embodiment. As shown in FIG. 8, the end cap 40 may be formed without the appendage 30e (of the embodiment FIG. 6), whereby the end cap cylindrical side wall 40a extends axially down the cell 10. The cylindrical end cap 40 is held in position via a compression fit. An adhesive may optionally be applied to the inside of the end cap 40 to adhere more permanently the end cap 40 to the cell 10. In an embodiment, a second end cap of similar configuration (with or without the center opening 30d) may be disposed on the bottom the negative end of the battery or cell, thereby in combination comprising a cell covering system.

The invention claimed is:

1. An end cap covering configured to accept and encompass a positive (+) terminal end of a cylindrical battery or cell, comprising: a ring-shaped end cap which partially covers a top of the battery or cell and extends axially down a side of the battery or cell to a positive cap groove of the battery or cell, the end cap formed with a central opening for access to the positive terminal of the battery or cell, and a circumferential appendage extending radially inward into the positive cap groove such that the end cap is held in place by the circumferential appendage in the positive cap groove.

2. An end cap covering according to claim 1, wherein the end cap is constructed of an insulative polymer material, wherein the end cap is operative to cover the top and side portions of a case of the battery or cell closest to the positive terminal, thereby providing an insulating barrier between a negatively charged battery case and the positive terminal.

3. An end cap covering according to claim 1, wherein the end cap is comprised of two semicircular halves that are thermally welded together after wrapping around the positive end of the battery or cell.

4. An end cap covering according to claim 1, where the end cap contains helical or angled ridges or threads to encourage placement over a cell wrapper of the battery or cell.

5. An end cap covering according to claim 1, where an adhesive is used to attach the end cap to the battery or cell.

6. A battery covering system comprising the end cap of claim 1, wherein the end cap comprises a first end cap covering a positive end of the battery or cell, and further comprising a second end cap covering a negative end of the battery or cell.

7. An end cap covering according to claim 1, wherein the end cap covering extends axially down the side of the battery or cell to cover an entirety of a case of the battery or cell.

8. An end cap covering according to claim 7, where a compression fit is used to attach the end cap covering to the battery case.

9. An end cap covering according to claim 7, where the end cap covering is comprised of two semicircular halves that are thermally welded together after wrapping around the positive end of the battery or cell.

10. An end cap covering according to claim 7, where the end cap contains helical or angled ridges or threads to encourage placement over a cell wrapper.

11. An end cap covering device according to claim 7, where an adhesive is used to attach the end cap to the battery or cell.

12. An end cap covering according to claim 1, wherein the end cap does not extend below the positive cap groove.

\* \* \* \* \*